T. KUBO.
AGRICULTURAL IMPLEMENT.
APPLICATION FILED MAR. 17, 1920.
1,405,044.   Patented Jan. 31, 1922.
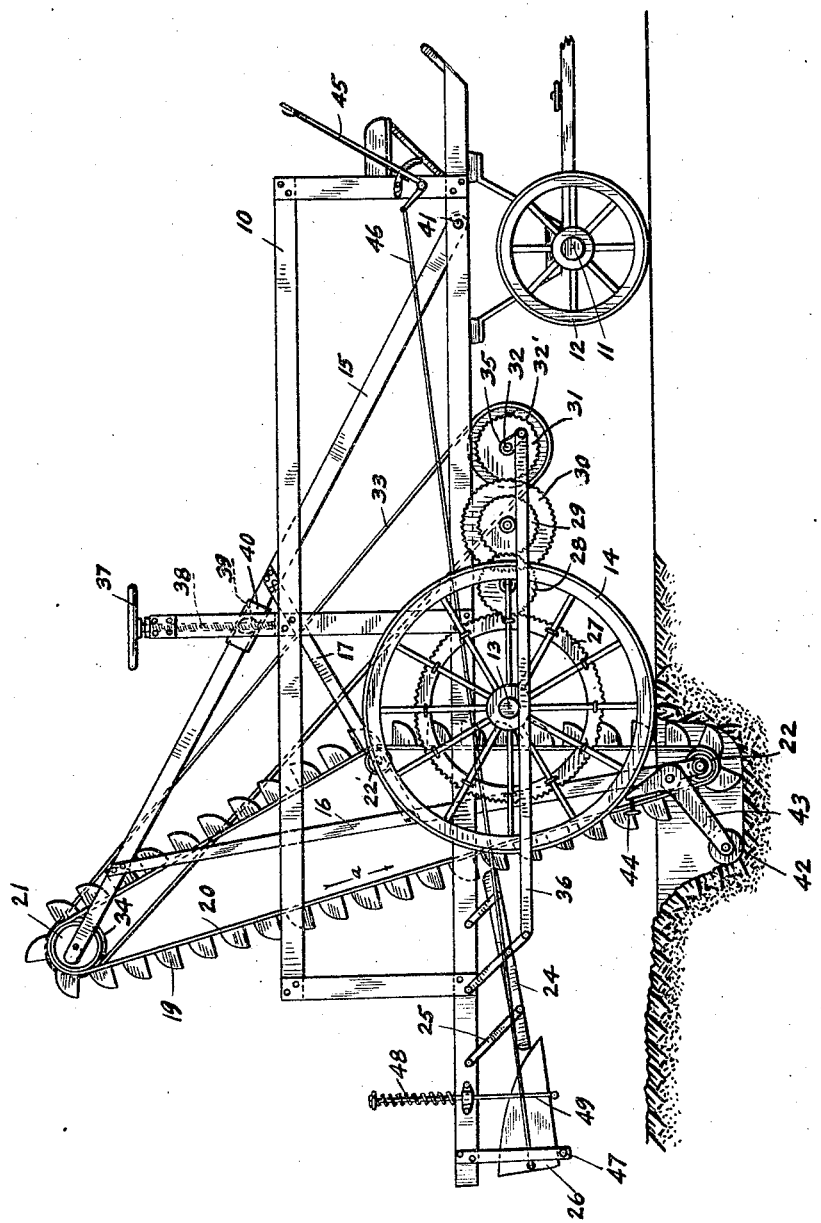
INVENTOR
Teikichi Kubo.
BY Chas. E. Townsend
ATTORNEY.

UNITED STATES PATENT OFFICE.

TEIKICHI KUBO, OF SACRAMENTO, CALIFORNIA.

AGRICULTURAL IMPLEMENT.

1,405,044.　　　　Specification of Letters Patent.　　Patented Jan. 31, 1922.

Application filed March 17, 1920. Serial No. 366,608.

*To all whom it may concern:*

Be it known that I, TEIKICHI KUBO, a citizen of Japan residing at Sacramento, in the county of Sacramento and State of California, have invented new and useful Improvements in Agricultural Implements, of which the following is a specification.

This invention relates to an agricultural implement.

It is the principal object of the present invention to provide an agricultural implement adapted to be used in clearing the ground of rocks, stubble and other objectionable matter and to place it in condition for future cultivation by means of an implement which may be easily moved over the soil to be treated and which will act in a direct and continuous manner to produce a separation of the soil and the objectionable material therein.

The present invention contemplates the use of a main frame supported on a suitable running gear and carrying means for digging up the soil, elevating it and thereafter screening the soil to separate objectionable material therefrom.

The invention is illustrated by way of example in the accompanying drawing, in which:

The figure indicates a view in side elevation showing the complete implement with which the present invention is concerned.

Referring more particularly to the drawing, 10 indicates a main frame, the front end of which is supported by a steering axle 11 and front wheels 12. The rear end of the main frame is supported on a driving axle 13 and enlarged rear wheels 14. A superstructure is carried by the frame 10 and consists of a radius bar 15 and a hanging frame 16. The radius bar is pivoted by its forward end to the lower portion of the main frame near the front thereof, while the hanging frame member is secured to the radius bar near its upper end and is reinforced by a crossbeam 17.

The frame structure comprising members 15, 16 and 17 is provided as a support for bucket conveyors 19. These buckets are mounted upon a chain 20 which is led around a sprocket 22 and over an idler roller 22'. This roller is substantially disposed in vertical alignment with the sprocket 22 and thus holds the forward run of the conveyor chain vertically so that the buckets may be drawn into the soil as the vehicle advances and will produce an excavation.

The elevator buckets are intended to pass over an upper sprocket 21 and will thus be inverted to dump the material therein upon a vibrating screen 24. This screen is carried by a plurality of links 25 which are suspended from the lower portion of the main frame and normally hold the screen in a rearwardly inclining position. At the rear of the screen a pan 26 is provided to receive the objectionable material separated from the soil, it being understood that the soil will be pulverized and will again fall upon the ground to fill the excavation made by the advancing vehicle.

The various mechanisms are driven from the large rear wheels 14, by a ring gear 27 which is in mesh with gear 28. One of these wheels is fitted with gear reduction which is made through gears 29 and 30 to a gear 31 on a shaft 32. A pulley 32' or a sprocket if desired is carried on the shaft for operating a belt 33. This belt is led around a suitable pulley 34 carried upon the shaft of the upper sprocket 21 and will act to drive the conveyor chain in the direction of the arrow —*a*—. The gear 31 also operates a crank arm 35. The crank lever 35 is pivotally connected to a pitman rod 36 which extends rearwardly and is pivotally secured to the frame of the vibrating screen 24. It will therefore be evident that as the crank arm rotates, reciprocation of the pitman rod will then take place and the screen 24 be vibrated.

In order that the depth of excavation may be adjustably determined a hand wheel 37 is fixed to a vertically extending screw 38, which screw is rotatably mounted in bearings on the main frame. A nut 39 is carried by the screw. This nut in turn is fixed to a sleeve 40 slidably mounted upon the radius bar 15 of the adjustable frame; thus when the sleeve 40 is vertically adjusted the bar 15 will swing from its pivot 41 and the entire A frame comprising members 15, 16 and 17 may be raised or lowered as the case may be.

In operation of the present invention the screw 38 is adjusted by means of the hand wheel 37 to determine the depth of the excavation. As the vehicle advances the conveyor chain will be driven in the direction of the arrow —*a*— and its foremost buckets will scrape the bottom and front of the excavation as they are elevated. These filled buckets will then be dumped when they pass over the sprockets 21, and the dirt with other material will fall upon the vibrating screen. In order that the buckets may not tend to dig into the ground and pull the entire conveying mechanism down, a follower wheel 42 is carried upon a bell crank 43 pivoted to the frame member 16. This follower is adapted to pass along the floor of the excavation and it may be regulated by a screw 44.

The falling dirt will be screened upon the vibrating member 24 and the large particles will gravitate into the pan 26. When this pan is filled it may be dumped by means of a lever 45 disposed at the forward end of the vehicle and fitted with a connecting rod 46. This rod is secured to the rear of the pan 26 and when drawn forwardly will swing the pan around a shaft 47. The pan will be restored to its original position by the expansion of springs 48 acting upon rods 49.

It will thus be seen that by the use of the present invention it is possible to rapidly pass over a field of ground and to clean the soil so that it may be placed in suitable condition for cultivation.

While I have shown the preferred form of my invention as now known to me it will be understood that various changes in the construction, combination and arrangement of parts may be made by those skilled in the art without departing from the spirit of the invention as claimed.

Having thus described my invention, what I claim and desire to secure by Letters Patent, is:

1. An agricultural implement comprising a running gear, a main frame thereon, an A-shaped frame mounted on said main frame having one of its legs pivotally connected to the forward part of the main frame and an adjustable support for holding the A-frame so that the pivotally connected leg is disposed in a rearward elevated position while the other leg is disposed downwardly, a rearward extension at the apex of the A-frame and a sprocket carried thereby, a roller on the lower end of the downwardly disposed leg of the frame, a bucket digger and conveyor carried by said sprocket and roller and means driven by the running gear to operate said sprocket.

2. An agricultural implement comprising a running gear, a main frame thereon, an A-shaped frame mounted on said main frame having one of its legs pivotally connected to the forward part of the main frame and an adjustable support for holding the A-frame so that the pivotally connected leg is disposed in a rearward elevated position while the other leg is disposed downwardly, a rearward extension at the apex of the A-frame and a sprocket carried thereby, a roller on the lower end of the downwardly disposed leg of the frame, an agricultural implement carried by said sprocket and roller, and means driven by the running gear to operate said sprocket.

3. An agricultural implement comprising a running gear, a main frame thereon, an A-shaped frame mounted on said main frame having one of its legs pivotally connected to the forward part of the main frame and an adjustable support for holding the A-frame so that the pivotally connected leg is disposed in a rearward elevated position while the other leg is disposed downwardly, a rearward extension at the apex of the A-frame and a sprocket carried thereby, a roller on the lower end of the downwardly disposed leg of the frame, a bucket digger and conveyor carried by said sprocket and roller and means driven by the running gear to operate said sprocket, and roller means connected to the lower end of the downwardly extending leg of the A-frame to additionally support said frame.

4. An agricultural implement comprising a running gear, a main frame thereon, an A-shaped frame mounted on said main frame having one of its legs pivotally connected to the forward part of the main frame and an adjustable support for holding the A-frame so that the pivotally connected leg is disposed downwardly, a rearward extension at the apex of the A-frame and a sprocket carried thereby, a roller on the lower end of the downwardly disposed leg of the frame, a bucket digger and conveyor carried by said sprocket and roller, means driven by the running gear to operate said sprocket, and adjustable roller means connected to the lower end of the downwardly extending leg of the A-frame to additionally support said frame.

5. An agricultural implement comprising a running gear, a main frame thereon, an A-shaped frame mounted on said main frame having one of its legs pivotally connected to the forward part of the main frame and an adjustable support for holding the A-frame so that the pivotally connected leg is disposed in a rearward elevated position while the other leg is disposed downwardly, a rearward extension at the apex of the A-frame and a sprocket carried thereby, a roller on the lower end of the downwardly disposed leg of the frame, a bucket digger and conveyor carried by said sprocket and roller, and means driven by the running gear to operate said sprocket.

In testimony whereof I have hereunto set my hand in the presence of two subscribing witnesses.

TEIKICHI KUBO.

Witnesses:
SILVEY PEARLE TINSLER,
R. B. TALBOT.